US012744599B2

(12) United States Patent
Jiang

(10) Patent No.: US 12,744,599 B2
(45) Date of Patent: Sep. 22, 2026

(54) METHOD AND SYSTEM FOR MONITORING NON-LINEAR EFFECTS ALONG AN OPTICAL COMMUNICATION LINE

(71) Applicant: HUAWEI TECHNOLOGIES CO., LTD., Shenzhen (CN)

(72) Inventor: Zhiping Jiang, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 297 days.

(21) Appl. No.: 18/663,406

(22) Filed: May 14, 2024

(65) Prior Publication Data

US 2025/0358009 A1 Nov. 20, 2025

(51) Int. Cl.

| | |
|---|---|
| ***H04B 10/07*** | (2013.01) |
| ***H04B 10/079*** | (2013.01) |
| ***H04B 10/2543*** | (2013.01) |
| *H04B 10/077* | (2013.01) |
| *H04B 10/25* | (2013.01) |
| *H04B 10/2507* | (2013.01) |
| *H04B 10/2537* | (2013.01) |
| *H04B 10/29* | (2013.01) |
| *H04J 14/02* | (2006.01) |

(52) U.S. Cl.

CPC ... *H04B 10/2543* (2013.01); *H04B 10/07951* (2013.01); *H04B 10/07* (2013.01); *H04B 10/077* (2013.01); *H04B 10/0777* (2013.01); *H04B 10/25* (2013.01); *H04B 10/2507* (2013.01); *H04B 10/2537* (2013.01); *H04B 10/29* (2013.01); *H04J 14/02* (2013.01)

(58) Field of Classification Search

CPC .......... H04B 10/2543; H04B 10/07951; H04B 10/07; H04B 10/077; H04B 10/0777; H04B 10/25; H04B 10/2507; H04B 10/2537; H04B 10/29; H04J 14/02

USPC .......................... 398/9–38, 43–103, 173–181

See application file for complete search history.

(56) References Cited

U.S. PATENT DOCUMENTS 6,275,313 B1 * 8/2001 Denkin .............. H04B 10/2916 398/9
6,310,716 B1 * 10/2001 Evans ................ H04B 10/2916 398/79

(Continued)

OTHER PUBLICATIONS

Wang et al., Stimulated Raman Scattering (SRS) Crosstalk Management in Pilot Tone Based Monitoring System, Sep. 2014, ECOC, All Document. (Year: 2014).*

(Continued)

*Primary Examiner* — Dibson J Sanchez
(74) *Attorney, Agent, or Firm* — BCF LLP

(57) ABSTRACT

Systems and methods for monitoring non-linear effects along an optical communication line transmitting an optical signal, the optical signal being formed from a plurality of sub-signals, each sub-signal being carried over a corresponding wavelength of a plurality of wavelengths. The method includes modulating, by a power dither, an optical power of a first set of sub-signals among the plurality of sub-signals at an output of a first amplifier assembly of the optical communication line; and determining, at a second amplifier assembly of the optical communication line downstream from the first amplifier assembly, a gain modulation affecting a second set of sub-signals due to the modulation of the optical power of the first set of sub-signals.

20 Claims, 7 Drawing Sheets

(56) References Cited

U.S. PATENT DOCUMENTS 7,184,672 B2 * 2/2007 Forbes ............... H04B 10/2537 398/208
8,078,054 B2 * 12/2011 Jiang ................... H04J 14/0227 398/32
10,965,373 B1 * 3/2021 Al Sayeed ......... H04B 10/0797
11,057,142 B1 * 7/2021 Jiang .................. H04B 10/2537
2002/0114029 A1 * 8/2002 Seydnejad ......... H04B 10/0775 398/32
2002/0114062 A1 * 8/2002 Simard .............. H04B 10/0775 359/337
2002/0114063 A1 * 8/2002 Chen .................. H04B 10/2941 359/337.4
2002/0114555 A1 * 8/2002 Seydnejad ............. G01N 21/65 398/147
2004/0004756 A1 * 1/2004 Hainberger ......... H01S 3/06758 359/341.3
2004/0032643 A1 * 2/2004 Chimfwembe ...... H04B 10/291 359/337
2004/0196534 A1 * 10/2004 Obeda .............. H04B 10/07955 359/337
2004/0208525 A1 * 10/2004 Seydnejad ......... H04B 10/0775 398/33
2007/0230960 A1 * 10/2007 Iannone .............. H01S 3/06754 398/79
2007/0280700 A1 * 12/2007 Remedios ........... H04J 14/0227 398/183
2009/0016727 A1 * 1/2009 Ueki ................. H04J 14/02216 398/79
2009/0196603 A1 * 8/2009 Zhou .................. H04B 10/0773 398/32
2012/0051739 A1 * 3/2012 Stephens ............ H04B 10/0773 398/25
2015/0189407 A1 * 7/2015 Jiang .................. H04Q 11/0066 398/34
2018/0234749 A1 * 8/2018 Chedore ........... H04J 14/02122
2019/0312641 A1 * 10/2019 Ishii ................. H04B 10/07957
2022/0255625 A1 * 8/2022 Wang ................. H04B 10/2537
2023/0084074 A1 * 3/2023 Guo ........................ G02F 1/395
2023/0261751 A1 * 8/2023 Liao ..................... H04B 10/293 398/202
2024/0322912 A1 * 9/2024 Gan ........................ H04J 14/02

OTHER PUBLICATIONS

Ji et al., Optical performance monitoring techniques based on pilot tones, Jul. 2004, OSA/JON, All Document. (Year: 2004).*

* cited by examiner

METHOD AND SYSTEM FOR MONITORING NON-LINEAR EFFECTS ALONG AN OPTICAL COMMUNICATION LINE

CROSS-REFERENCE TO RELATED APPLICATIONS

This is the first application filed for the instantly disclosed technology.

FIELD OF THE TECHNOLOGY

The present disclosure generally relates to the field of optical communications and, in particular, to methods and systems for monitoring non-linear effects along an optical communication line.

BACKGROUND

Typical implementation of optical networks, such as for example, dense wavelength division multiplex (DWDM) networks, involves an enormous number of optical devices and optical communication lines making standard monitoring systems inefficient. Moreover, during propagation of an optical signal along an optical communication line between a transmitting device and a receiving device, various impairments may appear such as non-linear effects. For example, Stimulated Raman Scattering (SRS) is a fiber nonlinearity which causes energy transfer from shorter wavelengths to longer wavelengths in DWDM systems.

Compensation of those impairments in the optical communication line remains an arduous and cumbersome task given that this determination typically requires a plurality of sensors integrated along the optical communication line by current solutions. Those solutions thus require heavy modification of the existing infrastructures.

Therefore, there remains an interest in being able to compensate non-linear effects such as SRS without additional systems added on the optical communication line.

SUMMARY

An aspect of the present disclosure provides a method for monitoring a non-linear effect along an optical communication line transmitting an optical signal, the optical signal being formed from a plurality of sub-signals, each sub-signal being carried over a corresponding wavelength of a plurality of wavelengths. The method includes modulating, by a power dither, an optical power of a first set of sub-signals among the plurality of sub-signals at an output of a first amplifier assembly of the optical communication line; and determining, at a second amplifier assembly of the optical communication line downstream from the first amplifier assembly, a gain modulation affecting a second set of sub-signals due to the modulation of the optical power of the first set of sub-signals.

In some implementations, the method further includes, in response to a failure occurring at the first amplifier assembly, adjusting a gain of the first amplifier assembly based on the gain modulation.

In some implementations, modulating the optical power of the first set of sub-signals comprises applying the power dither by modulating a pump signal of an optical pump of the first amplifier assembly.

In some implementations, modulating the optical power of the first set of sub-signals comprises applying the power dither by a variable optical attenuator.

In some implementations, modulating the optical power of the first set of sub-signals comprises applying, by a first optical amplifier of the first optical amplifier assembly, the power dither to the first set of sub-signals, the first amplifier assembly including: the first optical amplifier for amplifying optical power of the first set of sub-signals, and a second optical amplifier for amplifying optical power of the second set of sub-signals. In some implementations, determining a gain modulation comprises determining a variation of an optical power received at a third optical amplifier of the second amplifier assembly caused by the modulation, the second amplifier assembly including: a fourth optical amplifier for receiving and amplifying optical power of the first set of sub-signals, and the third optical amplifier for receiving and amplifying optical power of the second set of sub-optical signals.

In some implementations, the gain modulation is a Stimulated Raman Scattering non-linear effect.

In some implementations, wavelengths corresponding to the first set of sub-signals are C-band wavelengths and wavelengths corresponding to the second set of sub-signals are L-band wavelengths.

In some implementations, wavelengths corresponding to the first set of sub-signals are L-band wavelengths and wavelengths corresponding to the second set of sub-signals are C-band wavelengths.

In some implementations, the method further includes, with the power dither being a first power dither, applying, at the second amplifier assembly, a second power dither, the second dither modulating with an opposite phase to the first power dither.

In some implementations, determining the gain modulation comprises determining an experimental value of the gain modulation based on an optical power measurement executed at the second amplifier assembly; determining a theoretical value of the gain modulation based on parameters of the first amplifier assembly and the optical communication line; and in response to a difference between the experimental value and the theoretical value being lower than a pre-determined threshold, identifying the gain modulation as the experimental value.

According to other aspects of the present disclosure, there is provided an optical system for monitoring non-linear effects along an optical communication line transmitting an optical signal, the system including a controller; a first amplifier assembly operatively connected to the controller, the first amplifier assembly being optically connected to the optical communication line; and a second amplifier assembly operatively connected to the controller, the second amplifier assembly being optically connected to the optical communication line, the optical signal being formed from a plurality of sub-signals, each sub-signal being carried over a corresponding wavelength of a plurality of wavelengths. The controller is configured to modulate, by a power dither, an optical power of a first set of sub-signals among the plurality of sub-signals at an output of a first amplifier assembly of the optical communication line; and determine, at a second amplifier assembly of the optical communication line downstream from the first amplifier assembly, a gain modulation affecting a second set of sub-signals due to the modulation of the optical power of the first set of sub-signals.

In some implementations, in response to a failure occurring at the first amplifier assembly, the controller is further configured to adjust a gain of the first amplifier assembly based on the gain modulation.

In some implementations, the processor is configured to modulate the optical power of the first set of sub-signals by applying the power dither by modulating a pump signal of an optical pump of the first amplifier assembly.

In some implementations, the processor is configured to modulate the optical power of the first set of sub-signals by applying the power dither by a variable optical attenuator.

In some implementations, the first amplifier assembly includes a first optical amplifier for amplifying optical power of the first set of sub-signals, and a second optical amplifier for amplifying optical power of the second set of sub-signals; and the second amplifier assembly includes a third optical amplifier for receiving and amplifying optical power of the second set of sub-signals, and a fourth optical amplifier for receiving and amplifying optical power of the first set of sub-signals.

In some implementations, wavelengths corresponding to the first set of sub-signals are C-band wavelengths and wavelengths corresponding to the second set of sub-signals are L-band wavelengths.

In some implementations, wavelengths corresponding to the first set of sub-signals are L-band wavelengths and wavelengths corresponding to the second set of sub-signals are C-band wavelengths.

In some implementations, the power dither being a first power dither, the processor is further configured to apply, at the second amplifier assembly, a second power dither, the second power dither modulating with an opposite phase to the first power dither.

In some implementations, the processor is configured to determine the gain modulation by determining an experimental value of the gain modulation based on optical power measurement executed at the second amplifier assembly; determining a theoretical value of the gain modulation based on parameters of the first amplifier assembly and the optical communication line; and in response to a difference between the experimental value and the theoretical value being lower than a pre-determined threshold, identifying the gain modulation as the experimental value.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, lists of words, etc.

In the context of the present specification, the expression "component" is meant to include software (appropriate to a particular hardware context) that is both necessary and sufficient to achieve the specific function(s) being referenced.

In the context of the present specification, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned objects and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE FIGURES

The features and advantages of the present disclosure will become apparent from the following detailed description, taken in combination with the appended drawings, in which.

Figure 1:
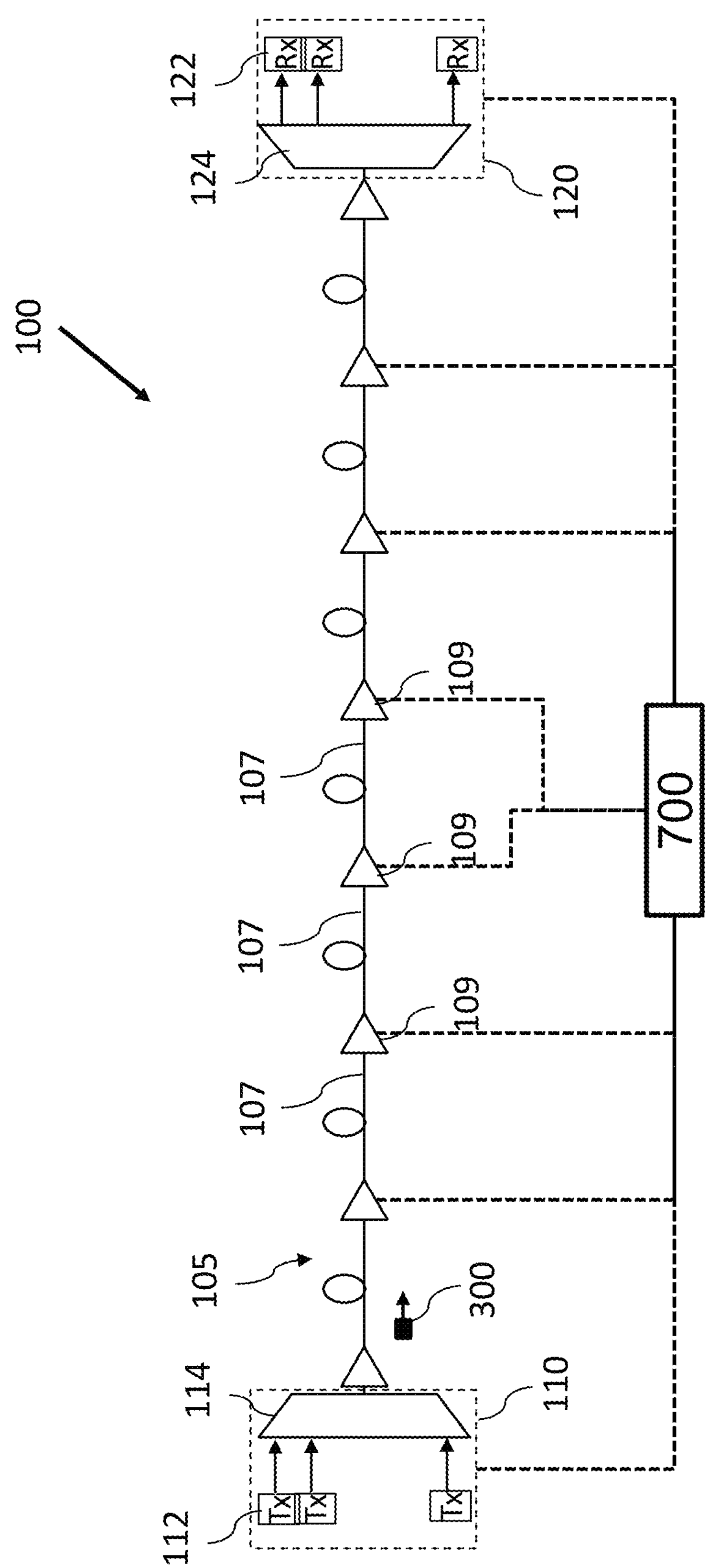
FIG. 1 is a schematic diagram of an optical communication line in accordance with some implementations of the present technology.

It is to be understood that throughout the appended drawings and corresponding descriptions, like features are identified by like reference characters. Furthermore, it is also to be understood that the drawings and ensuing descriptions are intended for illustrative purposes only and that such disclosures are not intended to limit the scope of the claims.

DETAILED DESCRIPTION

Various representative implementations of the described technology will be described more fully hereinafter with reference to the accompanying drawings, in which representative implementations are shown. The present technology concept may, however, be embodied in many different forms and should not be construed as limited to the representative implementations set forth herein. Rather, these representative implementations are provided so that the disclosure will be thorough and complete, and will fully convey the scope of the present technology to those skilled in the art. In the drawings, the sizes and relative sizes of layers and regions may be exaggerated for clarity. Like numerals refer to like elements throughout.

It will be understood that, although the terms first, second, third, etc. may be used herein to describe various elements, these elements should not be limited by these terms. These terms are used to distinguish one element from another. Thus, a first element discussed below could be termed a second element without departing from the teachings of the present technology. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is only intended to describe particular representative implementations and is not intended to be limiting of the present technology. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudo-code, and the like represent various processes which may be substantially represented in computer-readable media and so executed by a computer or processor, whether or not such computer or processor is explicitly shown.

The functions of the various elements shown in the figures, including any functional block labeled as a "controller", "processor" or "processing unit", may be provided through the use of dedicated hardware as well as hardware capable of executing software in association with appropriate software and according to the methods described herein. When provided by a processor, the functions may be provided by a single dedicated processor, by a single shared processor, or by a plurality of individual processors, some of which may be shared. In some implementations of the present technology, the processor may be a general purpose processor, such as a central processing unit (CPU) or a processor dedicated to a specific purpose, such as a digital signal processor (DSP). Moreover, explicit use of the term a "processor" should not be construed to refer exclusively to hardware capable of executing software, and may implicitly include, without limitation, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules or units which are implied to be software, may be represented herein as any combination of flowchart elements or other elements indicating performance of process steps and/or textual description. Such modules may be executed by hardware that is expressly or implicitly shown, the hardware being adapted to (made to, designed to, or configured to) execute the modules. Moreover, it should be understood that modules may include for example, but without being limitative, computer program logic, computer program instructions, software, stack, firmware, hardware circuitry or a combination thereof which provides the required capabilities.

With these fundamentals in place, we will now consider some non-limiting examples to illustrate various implementations of aspects of the present disclosure.

Broadly speaking, the present technology provides a system and a method for longitudinal performance monitoring of an optical communication line, In optical communication lines, some non-linear effects such as Stimulated Raman Scattering (SRS) can cause energy transfer from shorter wavelengths to longer wavelengths. More specifically, a positive gain is induced by shorter wavelengths to longer wavelengths and a negative gain is induced by longer wavelengths to shorter wavelengths This process may happen between any two wavelengths or wavelength bands. SRS induced energy transfer depends on the channel power, channel separation, fiber type, fiber length, etc.

With reference to FIG. 1, a high-level diagram of an optical system 100 and an optical communication line 105 is illustrated. The optical communication line 105 communicably connects a transmitting device 110 to a receiving device 120 for transmitting an optical signal 300 therebetween. The optical communication line 105 may be a conventional optical fiber such as, for example, a glass fiber surrounded by one or more coating layers. The optical communication line 105 may include an optical fiber core which transmits the optical signal 300, and an optical cladding, which confines the optical signal within the optical fiber core. It is also contemplated that light emitted by the transmitting device 110, thereby defining the optical signal 300, may be single polarized, dual polarized, or randomly polarized, may have a particular polarization (e.g. linearly polarized, elliptically polarized, or circularly polarized).

As depicted, the system 100 includes a plurality of optical amplifier assemblies 109 (e.g., erbium-doped fiber amplifier assemblies (EDFAs)) optically connected to the optical communication line 105. The assemblies 109 are placed in a sequence for amplifying the optical signal along the optical communication line 105. Use of one or more additional optical network elements and modules (which may include either or both of active and passive elements/modules), such as, for example, optical filters, Wavelength Selective Switches (WSSs), arrayed waveguide gratings, optical transmitting devices, optical receiving devices, processors and other suitable components along the optical communication line 105 is also contemplated in alternative implementations.

In this implementation, the transmitting device 110 includes a plurality of transmitters 112, each transmitter 112 being configured to emit a given signal such that the plurality of emitted signals is combined by a multiplexer 114 operatively coupled to the optical communication line 105. For example and without limitation, each transmitter 112 may be a laser source of a respective wavelength and communicatively connected to a corresponding processing unit (not shown) comprised in the transmitting device 110. The laser source is configured to produce, emit, and/or radiate pulses of light with certain pulse duration. In certain implementations, one or more transmitters 112 implemented as pulsed laser light sources may comprise one or more laser diodes, such as but not limited to, Fabry-Perot laser diode, a quantum well laser, a distributed Bragg reflector (DBR) laser, a distributed feedback (DFB) laser, or a vertical-cavity surface-emitting laser (VCSEL). Just as examples, a given laser diode may be an aluminum-gallium-arsenide (AlGaAs) laser diode, an indium-gallium-arsenide (InGaAs) laser diode, or an indium-gallium-arsenide-phosphide (InGaAsP) laser diode, or any other suitable laser diode. The multiplexer 114 may be a passive multiplexer such as, without limitation, a prism-based or a mirror-based multiplexer, or an active multiplexer based on a combination of passive components and tunable detectors, each detector being tuned to a specific frequency.

In this implementation, the receiving device 120 includes a demultiplexer 124 operatively coupled to the optical communication line 105 and configured to receive the optical signal 300 to output a plurality of output signals, each output signal being further directed to a corresponding receiver 122 of the receiving device 120. For example, the demultiplexer 124 may be configured to output the outputs signals based on wavelength, such that each receiver 122 corresponds to one of the transmitters 112. More specifically, the demultiplexer 124 may separate the optical signal 300, comprising the plurality of wavelengths emitted by the plurality of transmitters 112, into its wavelength components. The demultiplexer 124 may be a passive multiplexer, such as without limitation a prism-based, diffraction grating-based, or spectral filter-based demultiplexer, or an active demultiplexer based on a combination of passive components and tunable detectors, each detector being tuned to a specific frequency. In this implementation, the receivers 122 are photodiodes, each receiver 122 having its central wavelength corresponding to the wavelength emitted by its corresponding transmitter 112. Other types of receivers 122 are contemplated in alternative implementations.

In one aspect, the present technology provides systems for monitoring non-linear effects along the optical communication line 105. To do so, the optical amplifier assemblies 109 are communicably connected to a controller 700. In the depicted non-limiting implementation of the present technology, the controller 700 is a single controller. In alternative non-limiting embodiments of the present technology, the functionality of the controller 700 may be distributed and implemented via multiple controllers. In some implementations, each of a plurality of controllers could be implemented in a corresponding one of the optical amplifier assemblies 109.

By the present technology, the non-linear effect to be monitored and managed is the Stimulated Raman Scattering (SRS). The SRS induced gain may be calculated as follows.

Optical power $P_S(L)$ at distance L of the optical signal 300 is related to start point (distance 0) power $P_S(0)$ by the following equation:

$$P_S(L) = P_S(0)\exp\left(g_R\frac{P_0}{A_{eff}}L_{eff} - \alpha_S L\right) \tag{1}$$

where $\alpha_S$ is a fiber loss coefficient of the optical communication line 105 for the optical signal 300, $P_0$ is a pump power at an input of the optical communication line 105, $$L_{eff} = \frac{1-\exp(\alpha_P L)}{\alpha_P}$$

is an effective nonlinear length of the optical communication line 105, $\alpha_P$ is an attenuation coefficient at a wavelength of the optical signal 300, $A_{eff}$ is an effective area, and $g_R$ is a Raman gain coefficient.

The overall gain, including Raman gain and fiber attenuation is thus be written as:

$$G_{dB} = 10\log_{10}\exp\left(g_R\frac{P_0}{A_{eff}}L_{eff} - \alpha_S L\right) = \frac{10}{\ln 10}*\left(g_R\frac{P_0}{A_{eff}}L_{eff} - \alpha_S L\right) = 4.3429\left(g_R\frac{P_0}{A_{eff}}L_{eff} - \alpha_S L\right) \tag{2}$$

It should be noted that Equation (2) is valid for one particular wavelength $\lambda_i$ of the optical signal 300. In some implementations, the optical signal may include n wavelengths with respective optical power $[P(\lambda_1), P(\lambda_2), \ldots, P(\lambda_n)]$. In such as case, each wavelength may act as pump light for other n−1 wavelengths. To solve this, a frequency shift matrix $F_{shift}$ is introduced:

$$F_{shift} = \begin{bmatrix} 0 & \frac{1}{\lambda_1}-\frac{1}{\lambda_2} & \frac{1}{\lambda_1}-\frac{1}{\lambda_3} & \cdots & \frac{1}{\lambda_1}-\frac{1}{\lambda_n} \\ \frac{1}{\lambda_2}-\frac{1}{\lambda_1} & 0 & \frac{1}{\lambda_2}-\frac{1}{\lambda_3} & \cdots & \frac{1}{\lambda_2}-\frac{1}{\lambda_n} \\ \frac{1}{\lambda_3}-\frac{1}{\lambda_1} & \frac{1}{\lambda_3}-\frac{1}{\lambda_2} & 0 & \cdots & \frac{1}{\lambda_3}-\frac{1}{\lambda_n} \\ \cdots & \cdots & \cdots & \cdots & \cdots \\ \frac{1}{\lambda_n}-\frac{1}{\lambda_1} & \frac{1}{\lambda_n}-\frac{1}{\lambda_2} & \frac{1}{\lambda_n}-\frac{1}{\lambda_3} & \cdots & 0 \end{bmatrix} \tag{3}$$

The Raman gain vector $G_R$ may thus be written as:

$$G_R(\lambda_1, \lambda_2, \ldots, \lambda_n) = [P(\lambda_1), P(\lambda_2), \ldots, P(\lambda_n)]\, g_R(F_{shift}) \tag{4}$$

Equation (2) may thus be re-written as:

$$\text{G\_dB}(\lambda_1, \lambda_2, \ldots, \lambda_n) = 4.3429\left(G_R\frac{L_{eff}}{A_{eff}} - \alpha_S L\right) \tag{5}$$

Therefore, given fiber parameters and channel conditions, the SRS induced gain can be calculated using Equation (5) for each wavelength channel of the optical communication line 105. It should be noted that, in some current technologies, only the C band is used (1530 nm to 1565 nm). In order to increase the fiber capacity, some other current technologies also rely on the L band (1565 nm to 1625 nm) while C band and L band amplifications are done separately.

Figure 2:
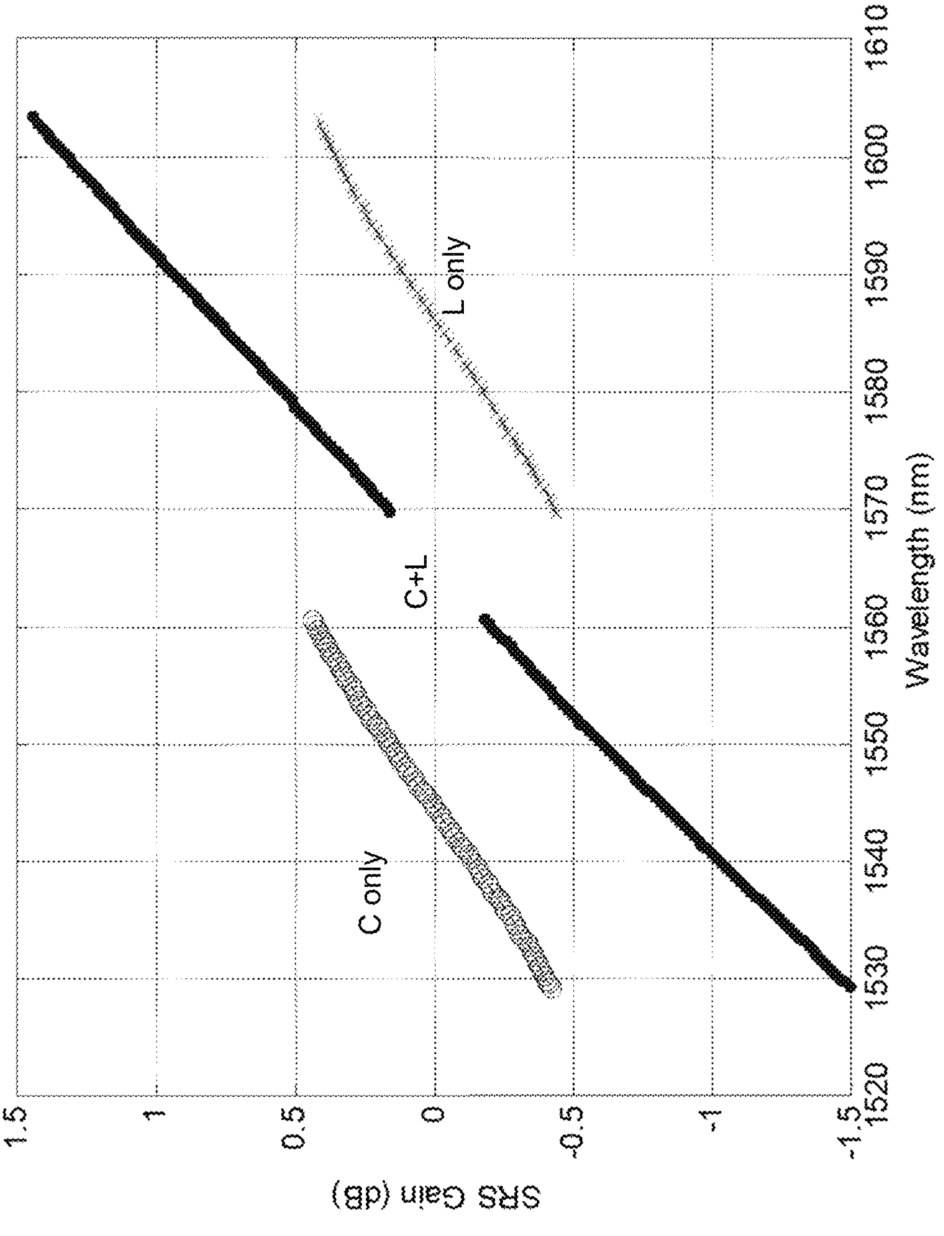
FIG. 2 is a chart showing simulated gain induced by Stimulated Raman Scattering (SRS) for optical signals on C-band only, L-band only and C- and L-bands.

As is noted above, the SRS induced gain $G_{SRS}(\lambda)$ depends on the channel conditions. FIG. 2 is a chart showing simulated gain induced by Stimulated Raman Scattering (SRS) for optical signal on C-band only, L-band only and C- and L-bands. In other words, FIG. 2 shows simulated results of $G_{SRS}(\lambda)$, assuming C-band only, L-band only and C- and L-bands. The simulation conditions for the chart of FIG. 2 are as follows. The optical communication line include a single mode fiber and is 80 km long with 1 dBm per channel power (with 50 GHz channel spacing) into fiber, and 80 channels in each of the C- and L-band. As is seen in FIG. 2, SRS causes negative gain in the short wavelength regime and positive gain the long wavelength regime. The SRS induced gain for C+L scenario is relatively stronger than C only or L only case. If C/L band is dropped (e.g. amplifier failure), or added (e.g. restoration), SRS gain may thus change drastically. Therefore, if one amplifier fails for the C- or L-band, the other amplifier should be adjusted to offset the SRS gain change.

Figure 3:
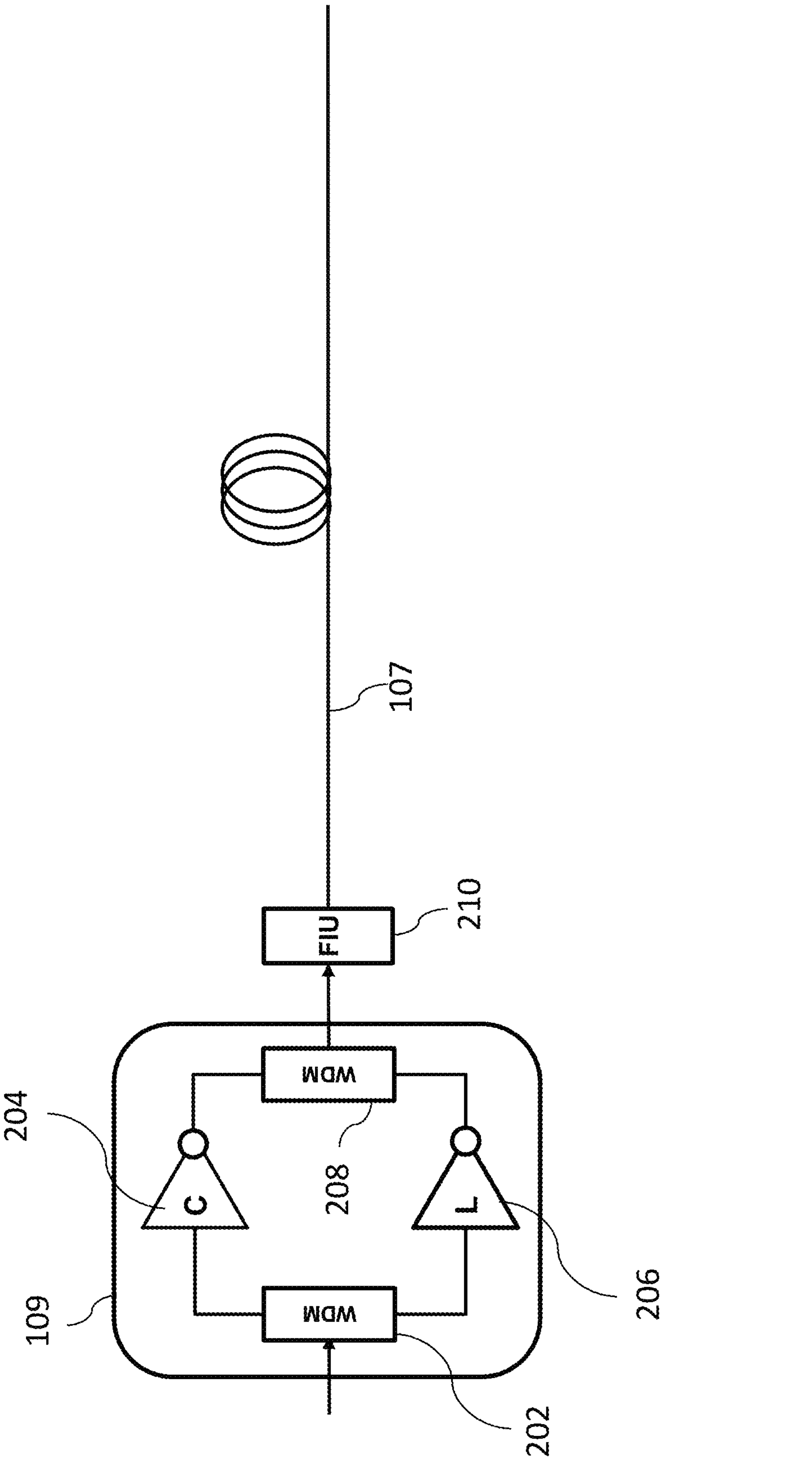
FIG. 3 is a schematic diagram of an optical amplifier assembly of the optical communication line of FIG. 1 in accordance with some implementations of the present technology.

FIG. 3 is a schematic representation of the amplifier assembly 109 in accordance with some non-limiting implementations of the present technology. In this implementation, the amplifier assembly 109 includes an input wavelength division multiplexing (WDM) system 202 that receives the optical signal 300 at an input of the amplifier assembly 109. In use, the input WDM system 202 demultiplexes the optical signal 300 such that a portion thereof corresponding to the C-band is directed to a first optical amplifier 204, or "C-band amplifier" 204, and another portion of the optical signal 300 corresponding to the L-band is directed to a second optical amplifier 206, or "L-band amplifier" 206. Outputs of the C-band amplifier 204 and the L-band amplifier 206 are further multiplexed by an output WDM system 208. The optical amplifier 204, 206 may be, for example, Erbium-doped fiber amplifiers (EDFAs).

For example, if the L-band amplifier 206 fails, the gain and the gain slope of the C-band amplifier 204 should therefore be adjusted to offset the SRS gain change in a downstream fiber 107. On FIG. 3, block 210 represents all additional losses (components, splices, connectors, . . . ) that may occur between the input WDM system 202 and the output WDM system 208, and at an input of the fiber span 107 connected to an output of the amplifier assembly 109.

Broadly speaking, in order to determine the SRS induced gain over an optical communication span 105, the controller 700 causes, in use, a power dither to be applied to one of the C- and L-transmission bands only. The power dither is then transferred to the other of the C- or L-transmission bands due to the SRS effect. The power dither transfer is modelled using an initial SRS coefficient, and may thus be monitored. In some implementations, the SRS coefficient is modified so that the modelled dither transfer is the same as the power dither that is monitored.

Figure 4:
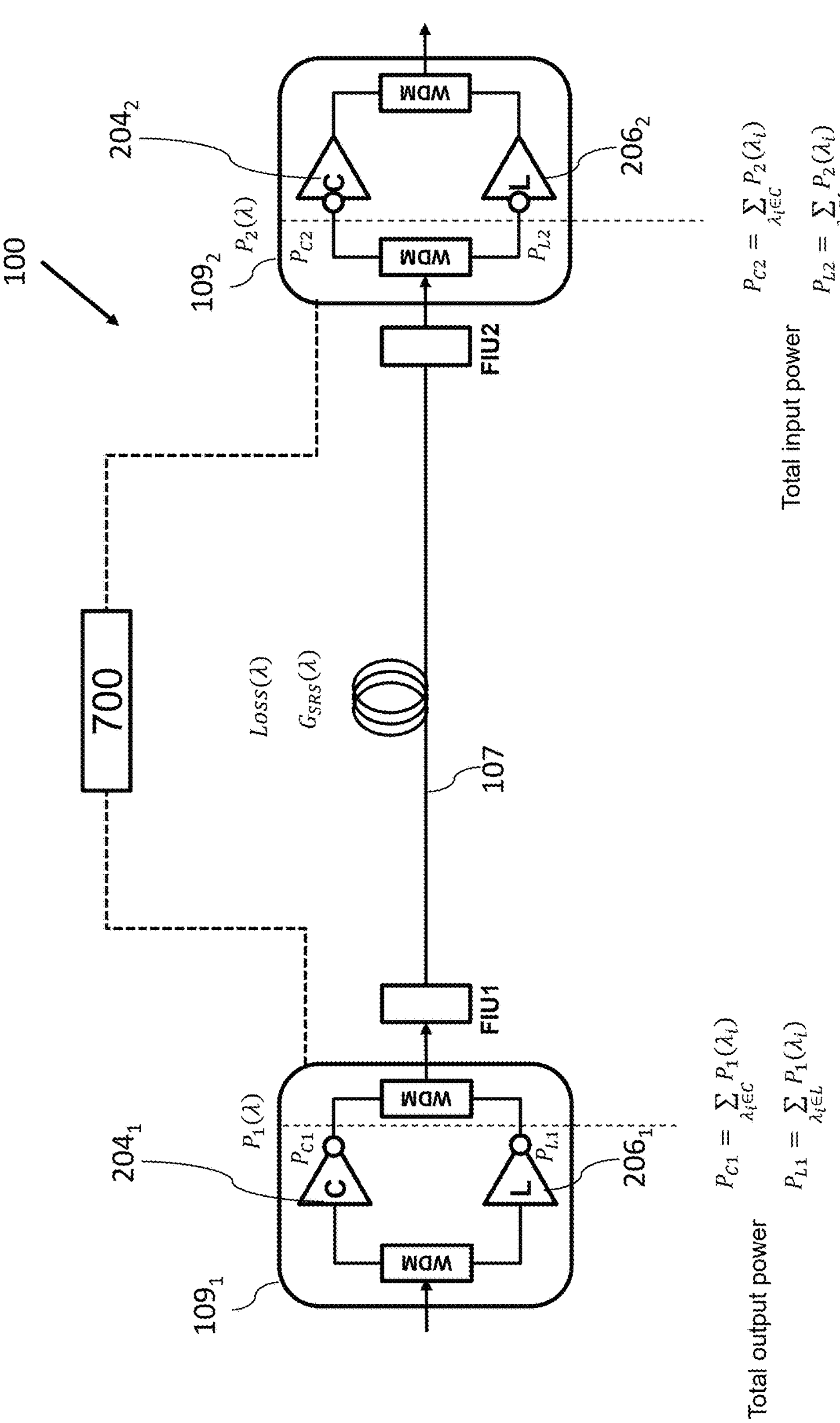
FIG. 4 is a block-diagram of two consecutive amplifier assemblies of the optical communication line of FIG. 1 in accordance with some implementations of the present technology.

Referring to FIG. 4, there is shown consecutive first and second amplifier assemblies $\mathbf{109}_1$, $\mathbf{109}_2$ that are communicably connected by a fiber span 107 carrying, in use, an optical signal from the first amplifier assembly $\mathbf{109}_1$ to the second amplifier assembly $\mathbf{109}_2$. As can be seen on FIG. 4, each one of the first and second amplifier assemblies $\mathbf{109}_1$, $\mathbf{109}_2$ includes two optical amplifiers, one for the C-band, and another one for L-band, and WDM systems that operates as described herein before.

In use and as was briefly described above, the controller 700 causes the first amplifier assembly $\mathbf{109}_1$ to apply a power dither to one of the C- or L-transmission bands. In the following example, the first amplifier assembly $\mathbf{109}_1$ applies the power dither to the C-band via the optical amplifier $\mathbf{204}_1$. By the present implementation, the power dither is a relatively low frequency power modulation with modulation index m<<1. With said power dither, a total power waveform is expressed as $P_{C1}(t)=P_{C1\_0}\,(1+m\sin(2\pi ft))$ at an output of the optical amplifier $\mathbf{204}_1$, where f is the dither frequency and $P_{C1\_0}$ is the optical power without the dither. It should be noted that the power dither is applied to all channels in the C-band in this example. In some implementations, the power dither may be generated by modulating a pump current of the optical amplifier $\mathbf{204}_1$ and/or by a Variable Optical Attenuator (VOA) of the first amplifier assembly $\mathbf{109}_1$.

Due to the SRS effect, the power dither applied to C-band is transferred to L-band at the second amplifier assembly $\mathbf{109}_2$ with modulation index m'. More specifically, optical power received at an optical amplifier $\mathbf{206}_2$ for the L-band of the second amplifier assembly $\mathbf{109}_2$ is generally expressed as $P_{L2}(t)=P_{L2\_0}(1+m'\sin(2\pi ft))$, where $P_{L2\_0}$ is the average power without the power dither tone.

According to the present implementation, the controller 700 further measures the current dither tone, denoted $m'_m$, using sensors implemented in the second amplifier assembly $\mathbf{109}_2$. It should be noted that the power dither may be monitored using existing monitoring hardware at the input/output of the amplifier assembly $\mathbf{109}_2$. In parallel, the controller 700 determines, in some implementations, a modelled dither tone $m'_c$ based on theorical default parameters (e.g. channel power, SRS coefficient, fiber loss coefficient, etc.). The controller 700 further determines a correction factor $k=m'_m/m'_c$. In another example, the power dither is applied by a second optical amplifier $\mathbf{206}_1$ for the L-band of the first amplifier assembly $\mathbf{109}_1$ and the dither tone may be measured at an optical amplifier $\mathbf{204}_2$ for the C-band of the second amplifier assembly $\mathbf{109}_2$. In some implementations, in response to a difference between the experimental value $m'_m$ and the theoretical value $m'_c$ being lower than a pre-determined threshold, the gain modulation is identified as the experimental value $m'_m$.

In some implementations, the current dither tone $m'_m$ is measured a plurality of times, such that the correction factor k may be iteratively updated. The measurements may stop once the variation of k between two consecutive measurements is below a pre-determined threshold. The following paragraph provides calculations to experimentally determine the current dither tone denoted $m'_m$ to further determine the correction factor k. With the present calculations, the SRS calibration may be performed one fiber span 107 at a time.

The signal channel power at fiber output z is related to its input power $P_s(0)$ by (for z=L) by:

$$P_s(L) = P_s(0)G_{SRS}\exp(-\alpha_s L),\ G_{SRS} = \exp(P_{Pump}g_R L_{eff} / A_{eff}),$$

$$L_{eff} = \frac{1-\exp(\alpha_{pump}L)}{\alpha_{pump}}$$

where $g_R$ is the Raman coefficient, $L_{eff}$ the effective nonlinear length, $A_{eff}$ the fiber effective area, $P_{pump}$ is an optical power of a pump channel into the fiber span 107, $\alpha_s$ and $\alpha_{pump}$ are loss coefficients for signal and the pump of the first amplifier assembly $\mathbf{109}_1$ respectively.

It should thus be noted that the SRS induced gain $G_{SRS}$ depends on the product of pump power $P_{Pump}$, Raman gain coefficient $g_R$, effective nonlinear length $L_{eff}$, and fiber effective area $A_{eff}$. In some use implementations, the correction factor k is used in SRS gain calculation: $G_{SRS}=\exp(kP_{Pump}g_R L_{eff}/A_{eff})$ to account for all potential parameter errors in SRS calculation. In response to a failure occurring at a given optical amplifier of an amplifier assembly of the communication line 105, the controller 700 may thus adjust gain of other optical amplifiers based on SRS-induced gain $G_{SRS}$ to compensate said failure.

In the above discussions, a closed form expression is used to estimate the SRS gain. However, in the actual applications, SRS calculation methods may also be used, including for instance numeric approaches.

Figure 5:
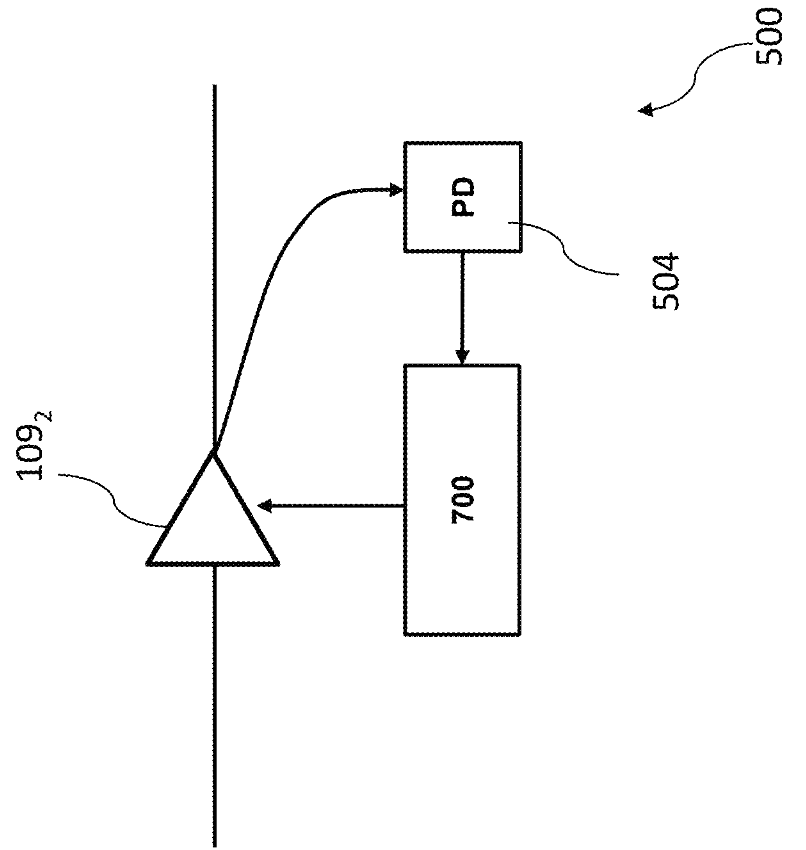
FIG. 5 is a schematic diagram of a dither cancellation assembly in accordance with some implementations of the present technology.

In some implementations, the second amplifier assembly $109_2$ includes a dither removing assembly 500 to remove the power dither from the optical signal before propagation thereof downstream of the second amplifier assembly $109_2$. FIG. 5 is a schematic diagram of the dither removing assembly 500. In this implementation, the dither removing assembly 500 includes a photodetector 504 that detects the power dither. The photodetector 504 is communicably connected to the controller 700 and transmits information about the power dither such that the controller 700 may cause the second amplifier assembly $109_2$ to apply an opposite power dither to cancel, or "remove", the power dither m using for example phase opposition between the power dither and the opposite power dither.

Figure 6:
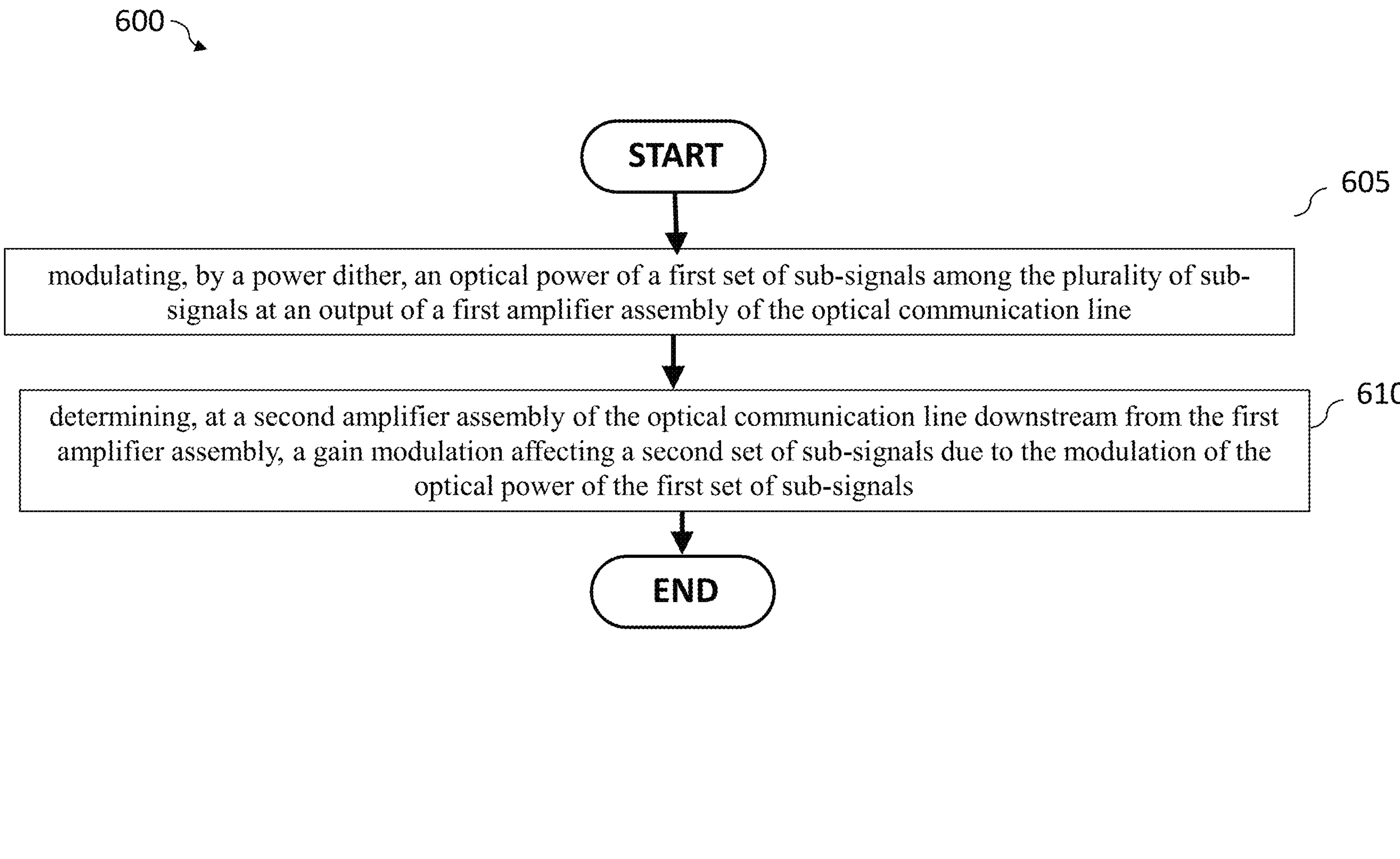
FIG. 6 is a flow diagram showing operations of a method for monitoring non-linear effects along an optical communication line in accordance with some implementations of the present technology.

With reference to FIG. 6, a method 600 for monitoring non-linear effect along an optical communication line transmitting an optical signal (e.g. the optical signal 300) is illustrated in the form of a flowchart. In some implementations, the optical signal includes a plurality of sub-signals over a plurality of wavelengths, each sub-signal being carried over a corresponding single wavelength of the plurality of wavelengths. For example, the non-linear effect may be a Stimulated Raman Scattering (SRS) effect.

In the present implementation, the method 600 is performed by the controller 700. In some implementations, one of more operations of the method 600 could be implemented, in whole or in part, by another computer-implemented device. It is also contemplated that the method 600 or one or more operation thereof may be embodied in computer-executable instructions that are stored in a computer-readable medium, such as a non-transitory mass storage device, loaded into memory and executed by a processor, such as the controller 700. Some operations or portions of operations in the flow diagram may be possibly being executed concurrently, omitted or changed in order.

The method 600 starts by modulating, at operation 605, an optical power of a first set of sub-signals among the plurality of sub-signals at an output of a first amplifier assembly of the optical communication line by applying a power dither. For example, the modulation of the optical power may be executed by applying the power dither by modulating a pump signal of an optical pump of the first amplifier assembly. In some other examples, the power dither is applied by a variable optical attenuator of the first amplifier assembly.

The method 600 continues with determining, at operation 610, a gain modulation affecting a second set of sub-signals due to the modulation of the optical power of a first set of sub-signals, said determination occurring at a second amplifier assembly of the optical communication line downstream from the first amplifier assembly. The gain modulation may be determined by determining an experimental value of the gain modulation based on optical power measurement executed at the second amplifier assembly and determining a theoretical value of the gain modulation based on parameters of the first amplifier assembly and the optical communication line. In response to a difference between the experimental value and the theoretical value being lower than a pre-determined threshold, the gain modulation may be identified as the experimental value.

For example, wavelengths corresponding to the first set of sub-signals may be located in the C-band and wavelengths corresponding to the second set of sub-signals located in the L-band. In another example, wavelengths corresponding to the first set of sub-signals could be located in the L-band and wavelengths corresponding to the second set of sub-signals could be located in the C-band.

In some implementations, the first amplifier assembly includes a first optical amplifier for amplifying optical signal of the first set of sub-signals, and a second optical amplifier for amplifying optical signal of the second set of sub-signals. In the same or other implementations, the second amplifier assembly includes a third optical amplifier for receiving and amplifying optical signal of the first set of sub-signals, and a fourth optical amplifier for receiving and amplifying optical signal of the second set of sub-signals.

In the present implementation, modulating optical power of a first set of sub-signals is executed by applying, by the first optical amplifier, the power dither to the first set of sub-signals and determining a gain modulation is executed by determining a variation of an optical power received at the fourth optical amplifier caused by the modulation.

In some implementations, the method 600 further includes adjusting, in response to a failure occurring at the first amplifier assembly, a gain of the first amplifier assembly based on the gain modulation.

In the same or other implementations, the power dither is a first power dither and the method 600 further includes applying, at the second amplifier assembly, a second power dither opposed to the first power dither in phase to cancel further propagation of the first power dither.

It will be appreciated that at least some of the operations of the method 600 may also be performed or managed by computer programs, which may exist in a variety of forms, both active and inactive. Such as, the computer programs may exist as software program(s) comprised of program instructions in source code, object code, executable code or other formats. Any of the above may be embodied on a computer readable medium, which include storage devices and signals, in compressed or uncompressed form. Representative computer readable storage devices include conventional computer system RAM (random access memory), ROM (read only memory), EPROM (erasable, programmable ROM), EEPROM (electrically erasable, programmable ROM), and magnetic or optical disks or tapes. Representative computer readable signals, whether modulated using a carrier or not, are signals that a computer system hosting or running the computer program may be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general.

Figure 7:
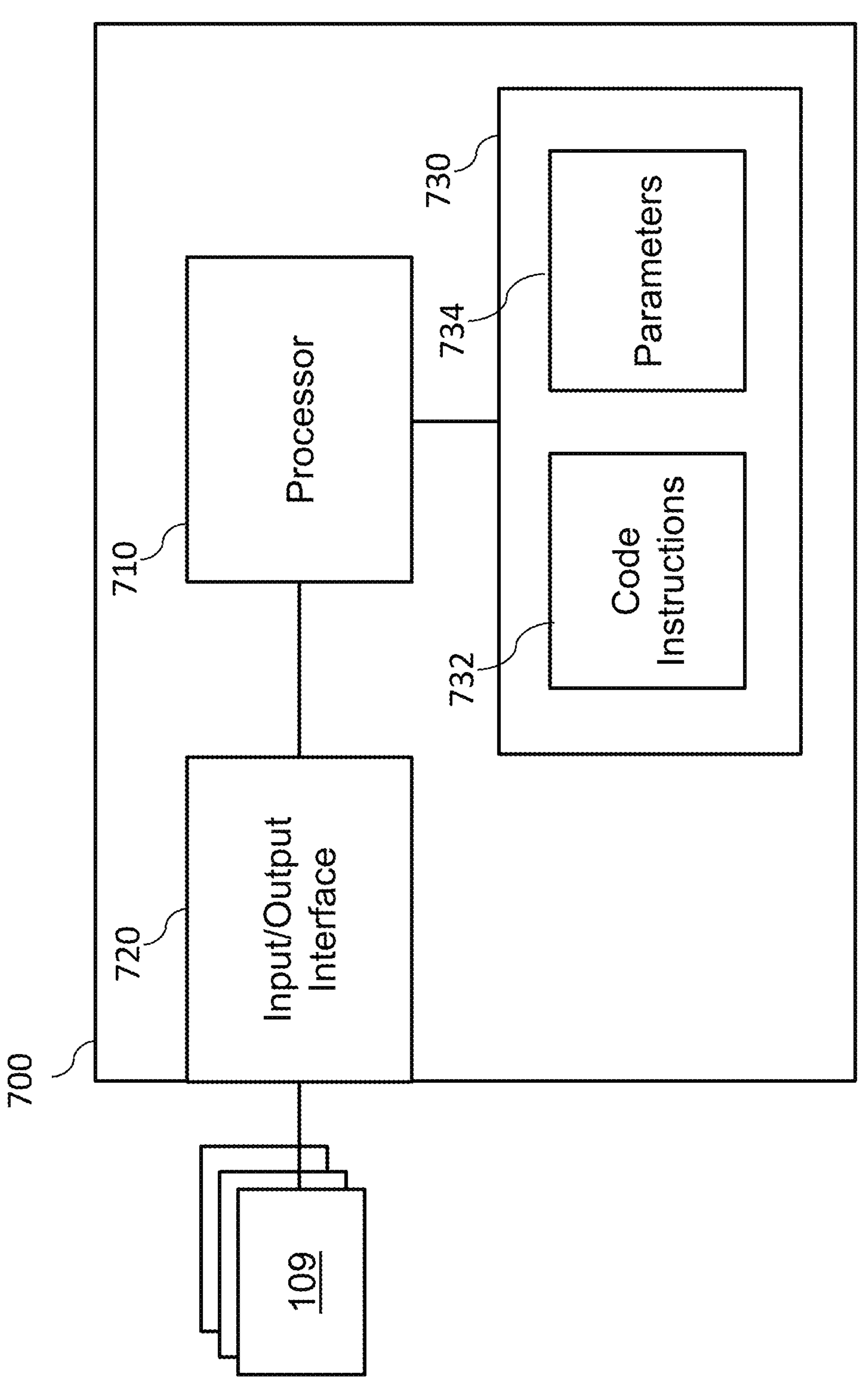
FIG. 7 is block diagram of a controller in accordance with an implementation of the present technology.

As an example, FIG. 7 is a schematic block diagram of the controller 700 according to an implementation of the present technology. The controller 700 comprises a processor or a plurality of cooperating processors (represented as a processor 710 for simplicity), a memory device or a plurality of memory devices (represented as a memory device 730 for simplicity), and an input/output interface 720 allowing the controller 700 to communicate with other components of the receiving device 120 and/or other components in remote communication with the optical amplifier assemblies 109. The processor 710 is operatively connected to the memory device 730 and to the input/output interface 720. The memory device 730 includes a storage for storing parameters 734. The memory device 730 may comprise a non-transitory computer-readable medium for storing code instructions 732 that are executable by the processor 710 to allow the controller 700 to perform the various tasks allocated to the controller 700 in the method 600.

The controller 700 is operatively connected, via the input/output interface 720, to the amplifier assemblies 109. The controller 700 executes the code instructions 732 stored in the memory device 730 to implement the various above-described functions that may be present in a particular implementation. FIG. 7 as illustrated represents a non-limiting implementation in which the controller 700 orchestrates some operations of the optical amplifier assemblies 109. This particular implementation is not meant to limit the present disclosure and is provided for illustration purposes.

It is to be understood that the operations and functionality of the described controller 700, its constituent components, and associated processes may be achieved by any one or more of hardware-based, software-based, and firmware-based elements. Such operational alternatives do not, in any way, limit the scope of the present disclosure.

While the above-described implementations have been described and shown with reference to particular operations performed in a particular order, it will be understood that these steps may be combined, sub-divided, or re-ordered without departing from the teachings of the present technology. At least some of the steps may be executed in parallel or in series. Accordingly, the order and grouping of the steps is not a limitation of the present technology.

It should be expressly understood that not all technical effects mentioned herein need to be enjoyed in each and every implementation of the present technology.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A method for monitoring non-linear effects along an optical communication line transmitting an optical signal, the optical signal being formed from a plurality of sub-signals, each sub-signal being carried over a corresponding wavelength of a plurality of wavelengths, the method comprising:

modulating, by a power dither, an optical power of a first set of sub-signals among the plurality of sub-signals at an output of a first amplifier assembly of the optical communication line; and determining, at a second amplifier assembly of the optical communication line downstream from the first amplifier assembly, a gain modulation affecting a second set of sub-signals due to the modulation of the optical power of the first set of sub-signals.

2. The method of claim 1, further comprising, in response to a failure occurring at the first amplifier assembly, adjusting a gain of the first amplifier assembly based on the gain modulation.

3. The method of claim 1, wherein modulating the optical power of the first set of sub-signals comprises:

applying the power dither by modulating a pump signal of an optical pump of the first amplifier assembly.

4. The method of claim 1, wherein modulating the optical power of the first set of sub-signals comprises:

applying the power dither by a variable optical attenuator.

5. The method of claim 1, wherein modulating the optical power of the first set of sub-signals comprises applying, by a first optical amplifier of the first optical amplifier assembly, the power dither to the first set of sub-signals, the first amplifier assembly including:

the first optical amplifier for amplifying optical power of the first set of sub-signals, and a second optical amplifier for amplifying optical power of the second set of sub-signals.

6. The method of claim 1, wherein determining a gain modulation comprises determining a variation of an optical power received at a third optical amplifier of the second amplifier assembly, said variation caused by the modulation, the second amplifier assembly including:

a fourth optical amplifier for receiving and amplifying optical power of the first set of sub-signals, and the third optical amplifier for receiving and amplifying optical power of the second set of sub-optical signals.

7. The method of claim 1, wherein the gain modulation is a Stimulated Raman Scattering non-linear effect.

8. The method of claim 1, wherein wavelengths corresponding to the first set of sub-signals are C-band wavelengths and wavelengths corresponding to the second set of sub-signals are L-band wavelengths.

9. The method of claim 1, wherein wavelengths corresponding to the first set of sub-signals are L-band wavelengths and wavelengths corresponding to the second set of sub-signals are C-band wavelengths.

10. The method of claim 1, with the power dither being a first power dither, further comprising applying, at the second amplifier assembly, a second power dither, the second dither modulating with an opposite phase to the first power dither.

11. The method of claim 1, wherein determining the gain modulation comprises:

determining an experimental value of the gain modulation based on optical power measurement executed at the second amplifier assembly;

determining a theoretical value of the gain modulation based on parameters of the first amplifier assembly and the optical communication line; and in response to a difference between the experimental value and the theoretical value being lower than a pre-determined threshold, identifying the gain modulation as the experimental value.

12. An optical system for monitoring non-linear effect along an optical communication line transmitting an optical signal, the system comprising:

a controller;

a first amplifier assembly operatively connected to the controller, the first amplifier assembly being optically connected to the optical communication line; and a second amplifier assembly operatively connected to the controller, the second amplifier assembly being optically connected to the optical communication line, the optical signal being formed from a plurality of sub-signals, each sub-signal being carried over a corresponding wavelength of a plurality of wavelengths, the controller being configured to:

modulate, by a power dither, an optical power of a first set of sub-signals among the plurality of sub-signals at an output of a first amplifier assembly of the optical communication line; and determine, at a second amplifier assembly of the optical communication line downstream from the first amplifier assembly, a gain modulation affecting a second set of sub-signals due to the modulation of the optical power of the first set of sub-signals.

13. The optical system of claim 12, wherein, in response to a failure occurring at the first amplifier assembly, the controller is further configured to adjust a gain of the first amplifier assembly based on the gain modulation.

14. The optical system of claim 12, wherein the processor is configured to modulate the optical power of the first set of sub-signals by applying the power dither by modulating a pump signal of an optical pump of the first amplifier assembly.

15. The optical system of claim 12, wherein the processor is configured to modulate the optical power of the first set of sub-signals by applying the power dither by a variable optical attenuator.

16. The optical system of claim 12, wherein:

the first amplifier assembly includes:

a first optical amplifier for amplifying optical power of the first set of sub-signals, and a second optical amplifier for amplifying optical power of the second set of sub-signals; and the second amplifier assembly includes:

a third optical amplifier for receiving and amplifying optical power of the second set of sub-signals, and a fourth optical amplifier for receiving and amplifying optical power of the first set of sub-signals.

17. The optical system of claim 12, wherein wavelengths corresponding to the first set of sub-signals are C-band wavelengths and wavelengths corresponding to the second set of sub-signals are L-band wavelengths.

18. The optical system of claim 12, wherein wavelengths corresponding to the first set of sub-signals are L-band wavelengths and wavelengths corresponding to the second set of sub-signals are C-band wavelengths.

19. The optical system of claim 12, wherein:

the power dither is a first power dither; and the processor is further configured to apply, at the second amplifier assembly, a second power dither, the second dither modulating with an opposite phase to the first power dither.

20. The optical system of claim 12, wherein the processor is configured to determine the gain modulation by:

determining an experimental value of the gain modulation based on optical power measurement executed at the second amplifier assembly;

determining a theoretical value of the gain modulation based on parameters of the first amplifier assembly and the optical communication line; and in response to a difference between the experimental value and the theoretical value being lower than a pre-determined threshold, identifying the gain modulation as the experimental value.

* * * * *